H. R. HARDING.
ORGANIZED MECHANISM FOR SKINNING AND CORING TOMATOES.
APPLICATION FILED JAN. 3, 1920.
1,356,447.
Patented Oct. 19, 1920.
3 SHEETS—SHEET 1.
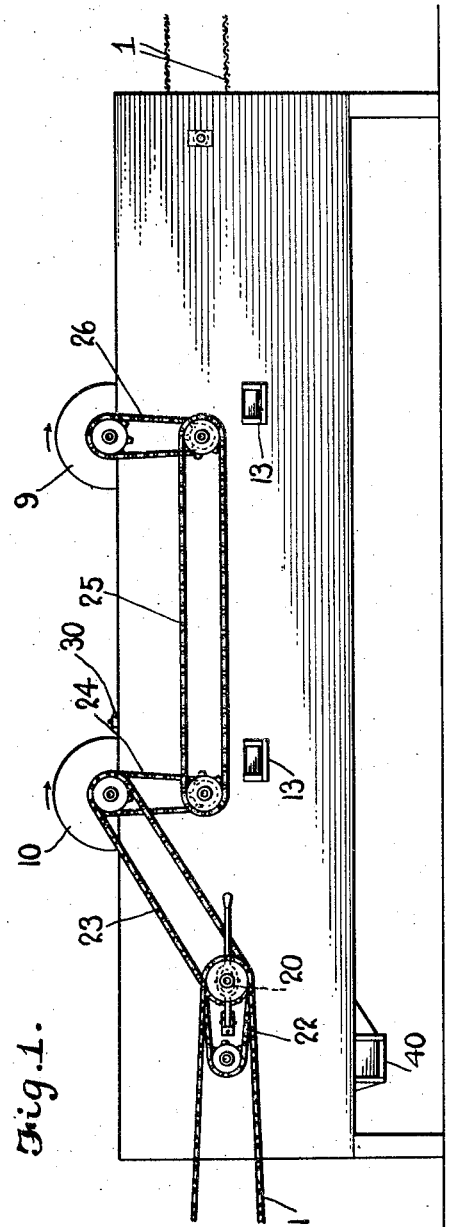
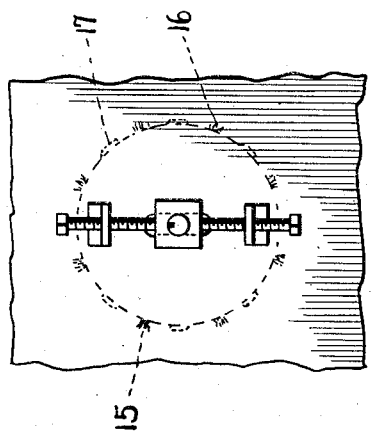
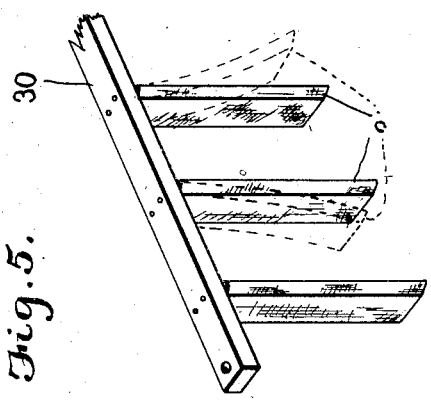
WITNESS:
L. B. James
INVENTOR.
Hiram R. Harding,
BY
Victor J. Evans ATTORNEY.

H. R. HARDING.
ORGANIZED MECHANISM FOR SKINNING AND CORING TOMATOES.
APPLICATION FILED JAN. 3, 1920.
1,356,447.
Patented Oct. 19, 1920.
3 SHEETS—SHEET 2.
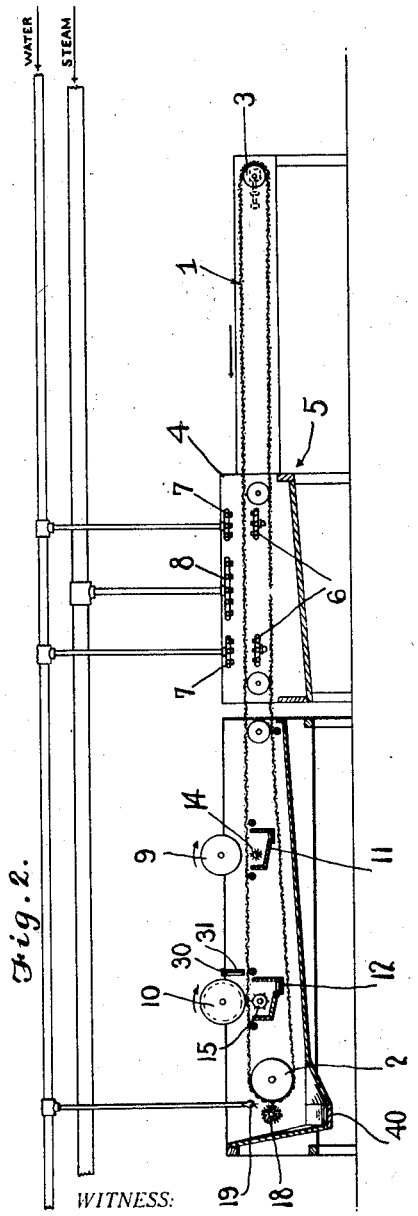
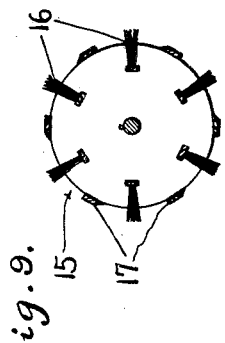
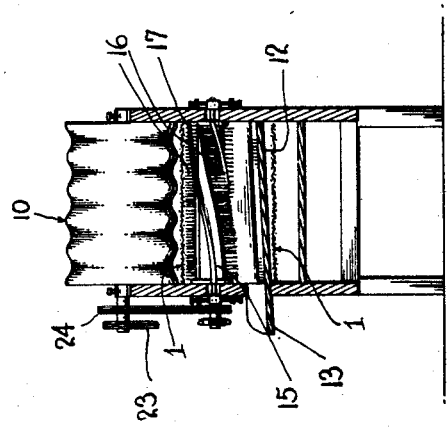
WITNESS:
L. B. James
INVENTOR.
Hiram R. Harding
BY
Victor J. Evans ATTORNEY.

H. R. HARDING.
ORGANIZED MECHANISM FOR SKINNING AND CORING TOMATOES.
APPLICATION FILED JAN. 3, 1920.
1,356,447.
Patented Oct. 19, 1920.
3 SHEETS—SHEET 3.
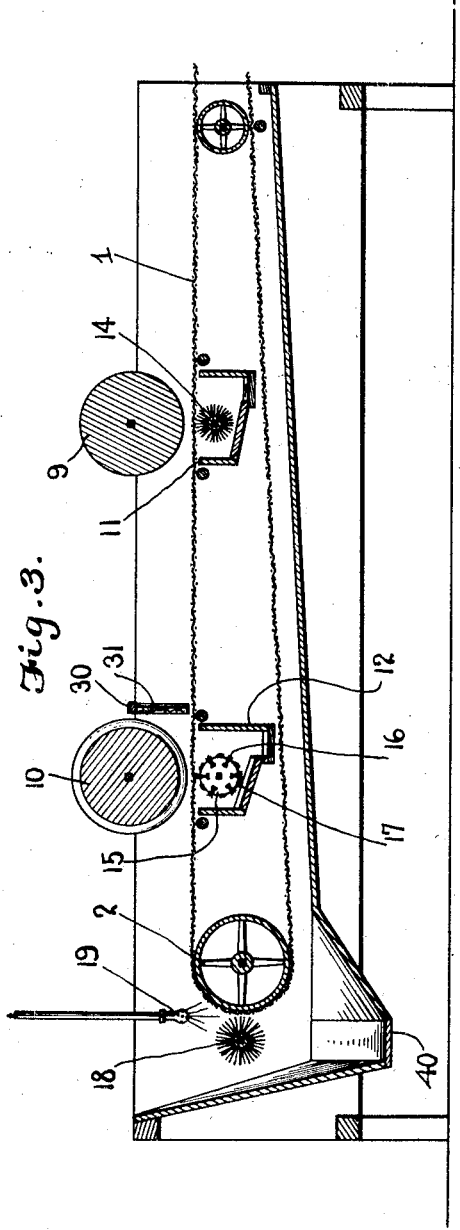
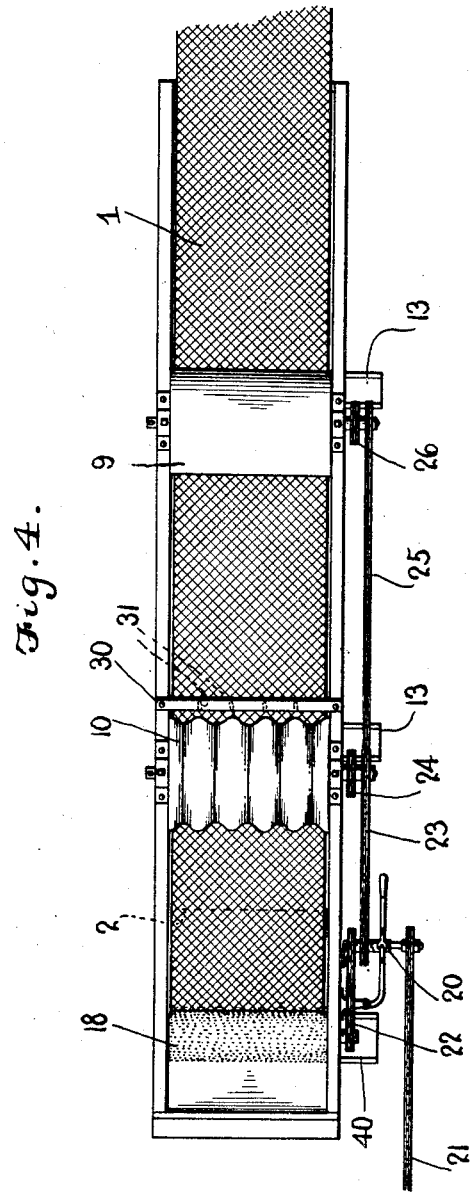
WITNESS:
L. B. James
INVENTOR.
Hiram R. Harding
BY
Victor J. Evans ATTORNEY.

UNITED STATES PATENT OFFICE.

HIRAM R. HARDING, OF TIPERS, VIRGINIA.

ORGANIZED MECHANISM FOR SKINNING AND CORING TOMATOES.

1,356,447.

Specification of Letters Patent.

Patented Oct. 19, 1920.

Application filed January 3, 1920. Serial No. 349,150.

*To all whom it may concern:*

Be it known that I, HIRAM R. HARDING, a citizen of the United States, residing at Tipers, in the county of Northumberland and State of Virginia, have invented new and useful Improvements in Organized Mechanism for Skinning and Coring Tomatoes, of which the following is a specification.

The object of my present invention is the provision of an organized mechanism through the medium of which tomatoes may be expeditiously, effectively, and economically skinned and cored in one continuous operation.

To the attainment of the foregoing, the invention consists in the labor-saving improvement as hereinafter described and definitely claimed.

In the accompanying drawings, hereby made a part hereof:

Figure 1 is a side elevation of the organized mechanism or apparatus comprised in my invention.

Fig. 2 is a longitudinal vertical section of the same.

Fig. 3 is an enlarged detail longitudinal vertical section of an important portion of the mechanism.

Fig. 4 is a plan view of the mechanism complete.

Fig. 5. is a perspective showing some of the tomato guides and the bar by which the same are carried.

Fig. 6 is a detail view illustrative of the manner in which the shafts of the rotary brush and the combined brush and cutter are adjustably fixed.

Fig. 7 is a transverse section with some of the parts in elevation.

Fig. 8 is an enlarged detail view illustrative of the manner in which tomatoes are engaged between the ribbed roll and the open-work conveyer.

Fig. 9 is a detail view of the combined brush and cutter.

Similar numerals of reference designate corresponding parts in all of the views of the drawings.

Among other elements the organized mechanism illustrated comprises an endless driven conveyer 1 that is of open-work construction and is preferably formed of reticulated material. The said conveyer 1 is passed around end rollers 2 and 3, supported in a frame-work as shown. The upper stretch of the conveyer is designed in practice to be moved in the direction indicated by arrow in Fig. 2 through the housing 4 of a skin-loosening device 5 which *per se* is not of my invention, the same being well known in the art. As shown in Fig. 2, the said device 5 includes cold water spray heads 6 disposed below the upper stretch of the conveyer 1, cold water spray heads 7 disposed above said upper stretch of the conveyer, and a steam-discharge head 8 also arranged above the upper stretch of the conveyer and between the cold water spray heads 7. When tomatoes are moved on the upper stretch of the conveyer 1 toward the left in Fig. 2, the tomatoes will first be washed and cooled by the water from the spray heads 6 and 7 at the right, will then be subjected to the heating action of the steam from the head 8, and will finally be subjected to the cooling action of the water from the heads 6 and 7 at the left, with the result that the skin on the tomatoes will be contracted and fitted for ready separation from the pulp or meat and the cores. After the movement toward the left of the tomatoes through the housing 4 of the device 5, the tomatoes are carried first under a roll 9 that is preferably quite heavy, and are then carried under a heavy and circumferentially ribbed roll 10; the said rolls 9 and 10 being driven by driving connections, hereinafter described, in the direction indicated by arrow in Fig. 2. Disposed under the upper stretch of the conveyer 1, and in vertical alinement with the roll 9, is a transverse receptacle 11, and disposed under the upper stretch of the conveyer 1 and in vertical alinement with the roll 10, is a transverse receptacle 12. Each of the said receptacles has an inclined bottom wall and also has a discharge spout 13, the latter being disposed at one side of the frame of the mechanism.

Mounted in the receptacle 11 for rotation under the upper stretch of the conveyer 1, is a driven brush 14, and mounted for rotation in the receptacle 12 and under the upper stretch of the conveyer 1 is a combined brush and cutter 15, the latter being provided, as best shown in Fig. 9, with stiff bristles 16 and cutting blades 17 alternating with the sets of bristles, and preferably arranged as shown in Fig. 7, so as to be capable of making drawn cuts.

Opposed to the conveyer 1 as the same passes about the roll 2, is a driven cleaning brush 18, and disposed above the meeting portions of the conveyer 1 and the said brush 18, is a spray head 19 adapted to be connected with a suitable source of water supply.

By reference to Fig. 1, it will be understood that the roll 2 is connected through an approved clutch coupling 20 with a band 21 leading from a motor (not shown). It will also be observed that the brush 18 is driven from the roll 2 through the medium of a sprocket connection 22, and that through the sprocket connections 23, 24, 25 and 26, the roll 10, the combined brush and cutter 15, the brush 14, and the roll 9 are driven from the roll 2. By virtue of this it will be manifest that by proper manipulation of the clutch coupling 20, the mechanism as a whole may be put in motion or may be stopped, at the will of the attendant.

Arranged adjacent to and at the right of the roll 10 is a transverse bar 30, and carried by the said bar are pendent flexible guides 31 of sole leather or equivalent material, which guides 31 are arranged in longitudinal alinement with the circumferential ribs of the roll 10, and are disposed with their lower ends adjacent to the upper stretch of the conveyer 1.

I prefer to mount the shafts of the rotary brush and the combined brush and cutter in bearings located between upper and lower screws as shown in Fig. 6. This, however, is not of the essence of my invention.

In the operation of the organized mechanism described, tomatoes are taken by hand from receptacles and unfit portions of the tomatoes are cut therefrom by the person or persons whose province it is to feed tomatoes to the mechanism. The tomatoes are placed by hand on the upper stretch of the conveyer 1 at a point at the right of the scalding device 5 in Fig. 2, care being taken to arrange each tomato with its bud portion—i. e., the portion diametrically opposite the stem portion or, in other words, the bloom portion or the bloom-side portion—lowermost, and opposed to the conveyer stretch and its stem or cap portion uppermost. As the upper stretch of the conveyer 1 moves toward the left in Fig. 2, the tomatoes are first carried through the device 5 for the treatment hereinbefore explicitly set forth. After leaving the housing 4 of the device 5, the tomatoes are carried under the roll 9 and are crowded between the said roll 9 and the upper stretch of the conveyer 1, with the result that the bud portions of the tomatoes will be caused to protrude downwardly through interstices of the conveyer 1, and the rotary brush 14 will be enabled to remove the skin from the said bud portions as the tomatoes are carried toward the left on the upper stretch of the conveyer. The skin portions so removed from the bud portions of the tomatoes will be deposited in the receptacle 11 from whence they may be removed in any approved manner. After passing under the roll 9, the tomatoes are carried toward the left on the upper stretch of the conveyer 1, and are engaged by the guides 31 and deflected into alinement with the spaces intermediate of the rounded circumferential ribs of the roll 10. Then as the tomatoes are carried on the upper conveyer stretch under the roll 10, the rounded ribs at opposite sides of each tomato will operate, by pressing on the shoulders of the tomatoes, to separate the skins from the meat, and will also operate to press the meat through the interstices of the conveyer stretch, so as to enable the blades 17 of the combined cutter and brush 15, to cut the meat from the cores; the cores and the skins being left on the upper stretch of the conveyer. The tomato meat pressed as stated through the interstices of the conveyer stretch, will be brushed and cut by the roll 15 from the conveyer stretch, and will be deposited in the receptacle 12, from which such meat may be taken in any approved manner for packing. The skins and cores are carried by the upper stretch of the conveyer 1 around the roll 2, and at such point are removed from the conveyer through the medium of the brush 18, with the result that the said skins and cores will be deposited in the trough 40, Figs. 2 and 3, and will be conveyed by the said trough 40 to a suitable point of discharge.

It will be apparent from the foregoing that by the proper operation of my novel organized mechanism, tomatoes may be effectively and expeditiously skinned and cored, and this with the employment of but a small number of attendants, with the result that a considerable saving in labor is attained.

While I prefer to employ rolls 9 and 10 that are quite heavy, I do not desire to be understood as confining myself to heavy rolls 9 and 10, inasmuch as light rolls, 9 and 10, might be employed without involving departure from the scope of my invention as defined in my appended claims.

Having described my invention, what I claim and desire to secure by Letters-Patent, is:

1. An organized mechanism for skinning and coring tomatoes, comprising means to scald tomatoes, means to remove the skins from the bloom-side portions of the tomatoes, means to separate the meat from the skins and cores, and movable supporting means to successively present tomatoes to said several means during a continuous movement of said supporting means.

2. An organized mechanism for skinning and coring tomatoes, comprising compression and cutting means to remove the skins from the bloom-side portions of the tomatoes, means to separate the meat from the skins and cores, and movable supporting means to successively present tomatoes to said several means during a continuous movement of said supporting means.

3. An organized mechanism for skinning and coring tomatoes in a continuous operation, comprising a foraminous conveyer, scalding means through which the conveyer extends, means in advance of the scalding means to press the bloom-portions of tomatoes through interstices of the conveyer, means at the opposite side of the conveyer to said pressing means to remove skins from said bloom portions, means in advance of said pressing means to press the meats of the tomatoes from the cores and skins and through interstices of the conveyer, and means at the opposite side of the conveyer to the last-named pressing means to cut the meats from the cores.

4. An organized mechanism for skinning and coring tomatoes in a continuous operation, comprising a foraminous conveyer, scalding means through which the conveyer extends, means in advance of the scalding means to press the bloom-portions of tomatoes through interstices of the conveyer, means at the opposite side of the conveyer to said pressing means to remove skins from said bloom portions, means in advance of said pressing means to press the meats of the tomatoes from the cores and skins through interstices of the conveyer, and means at the opposite side of the conveyer to the last-named pressing means to cut the meats from the cores and to remove the meats from the conveyer.

5. An organized mechanism for skinning and coring tomatoes in a continuous operation, comprising a housing, tomato scalding means in the housing, cooling means in the housing in advance of said scalding means, an endless foraminous conveyer the upper stretch of which is extended through said housing, a roll arranged above and in spaced relation to said upper stretch at a point in advance of the cooling means, a receptacle disposed under said stretch and in vertical alinement with said roll, a revoluble brush disposed in said receptacle in position to remove skin portions from the conveyer stretch, a roll arranged above and in spaced relation to the upper stretch of the conveyer at a point in advance of the first-named roll, a receptacle arranged below the upper stretch in vertical alinement with said roll, and a combined revoluble cutter and brush arranged in said receptacle in position to cut cores from the tomato meats and to remove the cores and skins from the conveyer stretch.

6. An organized mechanism for skinning and coring tomatoes in a continuous operation, comprising a housing, tomato-scalding means in the housing, cooling means in the housing in advance of said scalding means, an endless foraminous conveyer the upper stretch of which is extended through said housing, a roll arranged above and in spaced relation to said upper stretch at a point in advance of the cooling means, a receptacle disposed under said stretch and in vertical alinement with said roll, a revoluble brush disposed in said receptacle in position to remove skin portions from the conveyer stretch, a roll arranged above and in spaced relation to the upper stretch of the conveyer at a point in advance of the first-named roll, a receptacle arranged below the upper stretch in vertical alinement with said roll, a combined revoluble cutter and brush arranged in said receptacle in position to cut cores from the tomato meats and to remove the cores and skins from the conveyer stretch, and means in advance of the second-named roll to clean the conveyer stretch.

In testimony whereof I affix my signature.

HIRAM R. HARDING.